Dec. 5, 1933.  R. T. KORB  1,938,293
WIRE BELT
Filed April 12, 1932
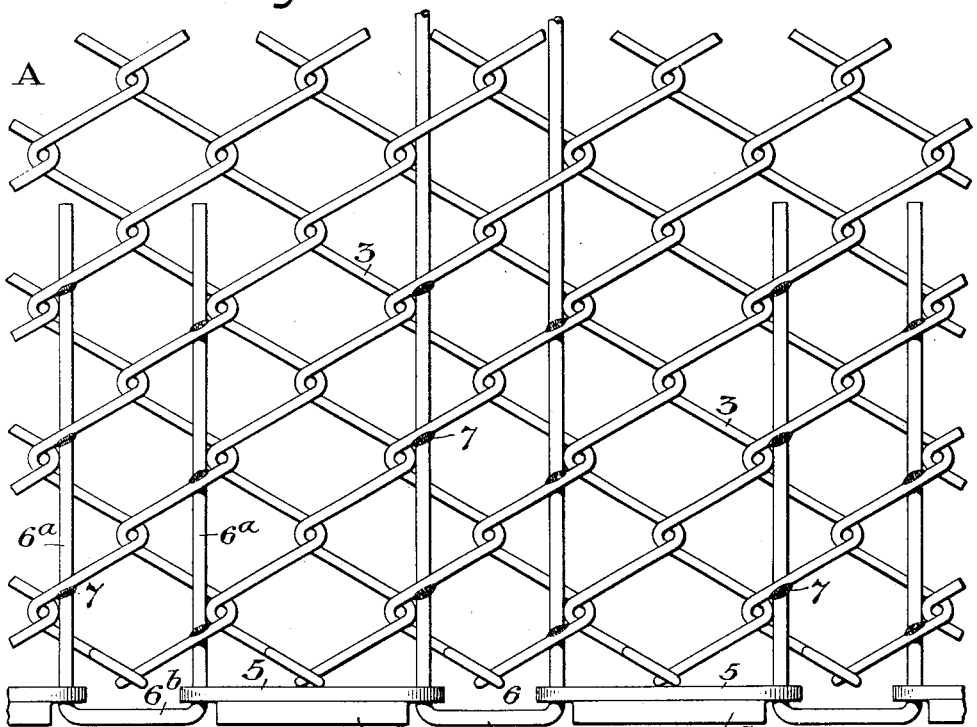
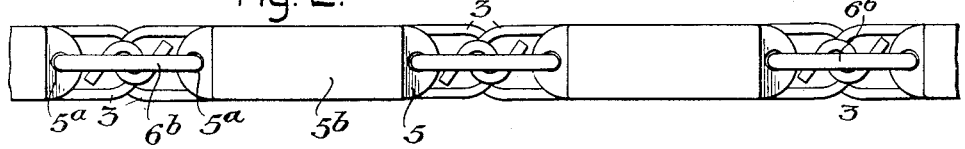
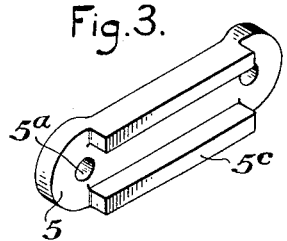
INVENTOR:
Robert T. Korb,
by Murray C. Boyer
Atty.

Patented Dec. 5, 1933

1,938,293

UNITED STATES PATENT OFFICE 1,938,293

WIRE BELT

Robert T. Korb, Haddon Heights, N. J.

Application April 12, 1932. Serial No. 604,788

6 Claims. (Cl. 198—193)

My invention relates to woven wire fabrics such, for instance, as those used as conveyer belts, aprons, and the like, and particularly relates to a selvedge for the same.

It is well known that woven wire fabrics employed as belts, aprons, and the like, frequently wear out first at their marginal edges while, except for such wear, the remainder of the belt or other woven wire structure has a long, useful life remaining.

In order to obtain the full useful life of these woven wire belts, selvedges of various types have been proposed, but those heretofore in use have had certain undesirable features, either lack of strength, lack of suitable flexibility, or excessive manufacturing cost.

It is an object of my invention to provide a novel selvedge for a woven wire belt which may be readily connected to the belt; may be substantially as flexible as the belt itself, and will be of such strength that the belt will not be worn at its marginal edge prior to the time it is otherwise worn out.

Another object of my invention is to provide a belt in which portions of the selvedge may form a means for stiffening the belt.

Other objects and advantages of my invention will be apparent from the following specification and claims; reference being had to the accompanying drawing, in which:

Figure 1 is a plan view of a portion of a belt embodying my invention.

Fig. 2 is a side elevation or edge view of the belt shown in Fig. 1, and

Fig. 3 is a perspective view of a constructional detail within the scope of my invention.

My invention may comprise a wire belt of well known form such, for instance, as that indicated at A, Fig. 1; such belt being composed of interlocking helical wires 3. The belt may be woven and the ends of each of the wires of the belt bent over in well known manner so that such ends lie along a single, substantially straight line. Obviously, belts made up of helically coiled wires of weaves different from that shown may be employed such, for instance, as those of the herringbone type.

To the belt proper are connected a plurality of links 5, by a series of connectors 6 of U-shape, having legs 6$^a$ and a connecting loop portion 6$^b$. Each leg of a connector 6 passes through an opening 5$^a$ in adjacent links so that the several links are joined by the connectors, and these legs 6$^a$ then pass within the convolutions of a single helical wire forming the belt and are welded thereto at suitable points, such as indicated at 7.

I have found that suitable longitudinal flexibility may be obtained by use of links and connectors of such size relative to the size of the interlocking helical wires 3 forming the belt that the two legs of one connector may be welded to adjacent helical wires and that two interlocking helical wires intervene between the pairs of wires to which the connectors have been welded.

The legs of the connectors 6 may be of varied lengths, depending upon the use to which it is desired to put the belt, so that when the belt is in use the connectors may also serve the function of stiffening the belt transversely, that is, along lines at right angles to the line of pull of the belt, to any desired degree; the full width of the belt, for instance.

The links 5 may be substantially of the shape shown in Figs. 1 and 2 of the drawing, that is, with a raised portion 5$^b$ substantially equal to the thickness of the wire forming the loop of the connectors. This shape may be obtained in numerous ways such as, for instance, in the manner shown by spot or otherwise welding a piece of metal of substantially the thickness of the projecting looped portion of the connector to the outer face of each link, or such links may be stamped to the shape shown in Fig. 3, with the flanges 5$^c$ whose outer edges will be flush with the loop portions of the connectors. It will be obvious that with such a construction the outer face of the links 5 and the looped portions 6$^b$ of the connectors 6 will lie in a common plane and will form a substantially smooth edged selvedge.

Links 5 formed by welding or stamping may be used in place of those shown in Figs. 1 and 2; the particular shape of the link or manner of its formation being immaterial so long as the outer edge or surface of the link lies in substantially the same plane as the outer edge of the looped portion of the connector 6.

Obviously, the relative sizes of the connectors and links may be varied as found desirable in view of the use to which it is desired to put the belt and such desired flexibility obtained as may be necessary or desirable in connection with the use to which the belt is to be put. While I have shown connectors having legs circular in cross section it will be understood that the connectors may be made of material square in cross section, or of other suitable polygonal shape.

It will be apparent from the foregoing that the selvedge proposed by me may be equally well applied to belts which are now in use in the field, as to those which are in process of manufacture, and my selvedge is not necessarily applied as a part of the manufacturing process.

Various modifications may be made in the above described embodiment of my invention without departing from the spirit and scope thereof as set forth in the following claims.

I claim:—

1. A conveyor belt comprising a metal fabric consisting of interconnected helically twisted wires, a plurality of independent apertured links disposed at a marginal edge of said fabric, and U-shaped connectors for securing said links to the belt; said connectors having legs passing through the apertures of said links and extending a short distance into the fabric, and means for joining said legs to the wires of said fabric.

2. A conveyor belt comprising a fabric consisting of interconnected helically twisted wires, a plurality of independent apertured links disposed at a marginal edge of said fabric, and U-shaped connectors for securing said links to the belt; said connectors having legs passing through the apertures of said links and extending a short distance into the fabric, and means for joining said legs to individual wires of said fabric, said links having their outer faces arranged to lie in the same plane as the loops of said connectors.

3. A conveyor belt comprising a fabric consisting of a plurality of interconnected helically twisted wires, a plurality of independent apertured links disposed at a marginal edge of said fabric, U-shaped connectors comprising a pair of relatively short legs with a connecting loop; said legs passing through the apertures of said links and joined to individual wires of said fabric, and means comprising projections on said links extending outwardly therefrom and lying in the same plane as the loop portions of said connectors.

4. A conveyor belt comprising a plurality of interlocking helical wires having their ends in a single plane, a plurality of links disposed adjacent to the marginal edge of said interconnected helical wires, connectors comprising U-shaped members having relatively short legs passing through said links and loop portions for said legs lying in a plane substantially parallel to the marginal edge of the belt, means for joining the legs of said connectors to certain of the helical wires independently of their interlocked relation, and projections carried by the links and extending outwardly to lie in the same plane as the loop portions of said connectors.

5. A conveyor belt comprising a plurality of interlocking helical wires having their ends connected together in pairs to lie in a single plane and form a marginal edge, a plurality of independent links arranged in parallel relation with respect to the marginal edge of the belt, U-shaped connectors comprising loops and legs which pass through said links and lie within the convolutions of certain of the helical wires, means for joining said connector legs to the wires in which they enter, and means carried by the links whereby their outer surfaces are maintained in the same planes as the loops of the connectors.

6. A conveyor belt comprising a woven wire fabric having marginal edges in a single plane, a plurality of independent links disposed adjacent the marginal edges of said belt; said links having openings at each end, a plurality of U-shaped connectors for securing said links to the belt; the legs of said connectors passing through the openings of said links and extending a short distance into said fabric, and means for attaching said connector legs to said fabric.

ROBERT T. KORB.